Feb. 4, 1958     T. MARZANI     2,821,792
APPARATUS FOR GRAPHICALLY REPRESENTING THE
SUPERPOSITION OF FUNCTIONS
Filed Dec. 7, 1953     2 Sheets-Sheet 1
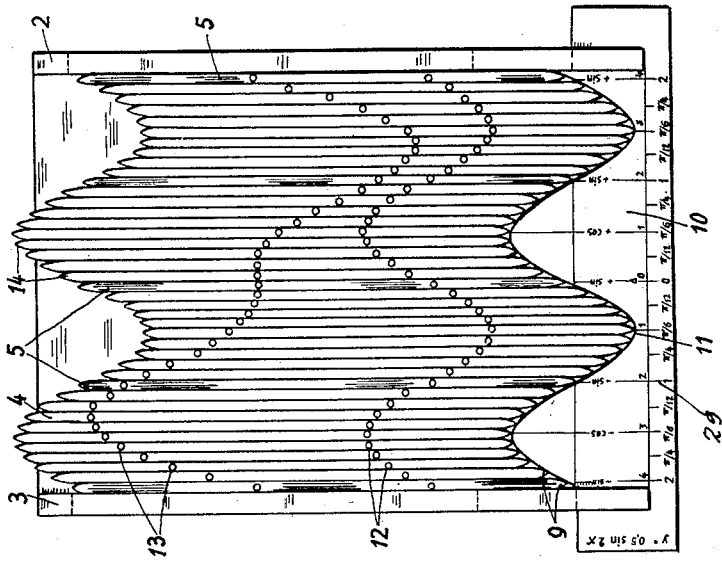
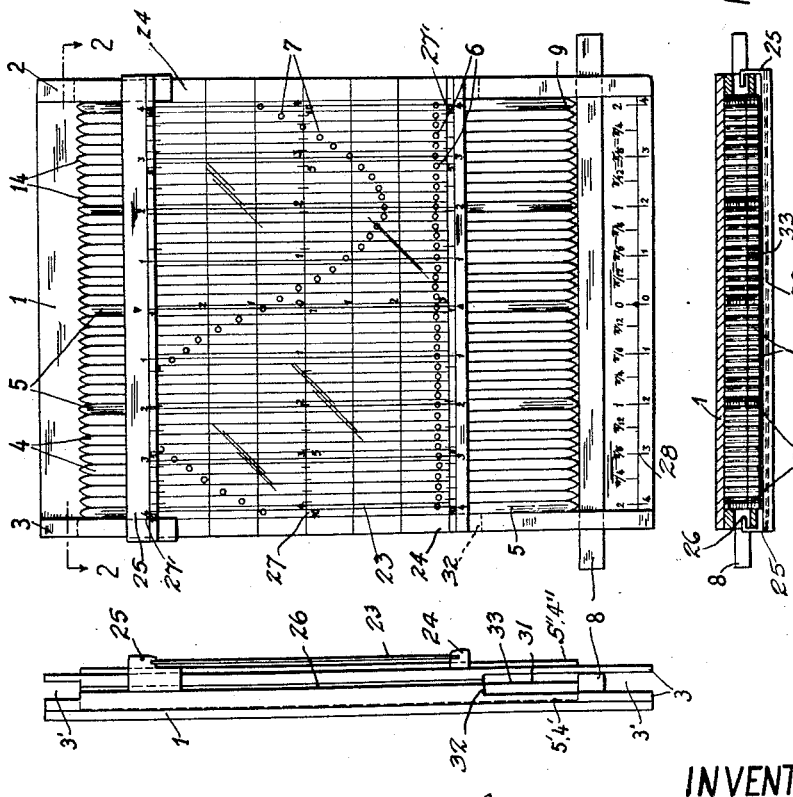
INVENTOR
T. Marzani Feb. 4, 1958               T. MARZANI            2,821,792
APPARATUS FOR GRAPHICALLY REPRESENTING THE
SUPERPOSITION OF FUNCTIONS
Filed Dec. 7, 1953                             2 Sheets-Sheet 2
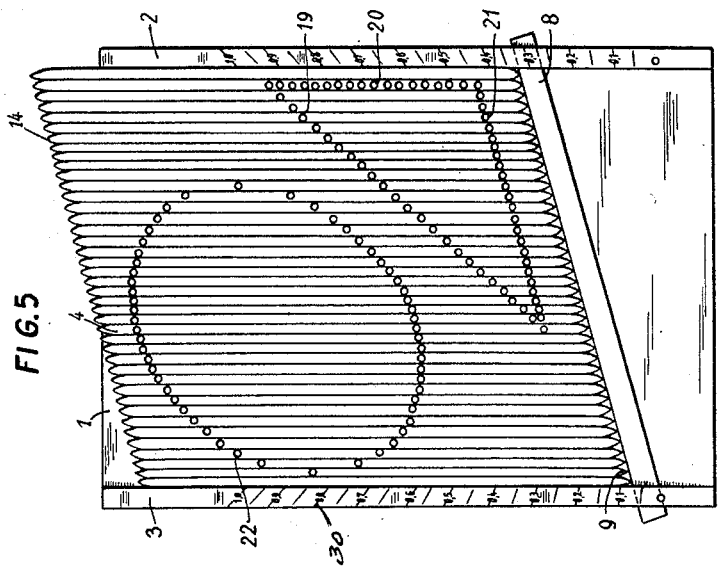
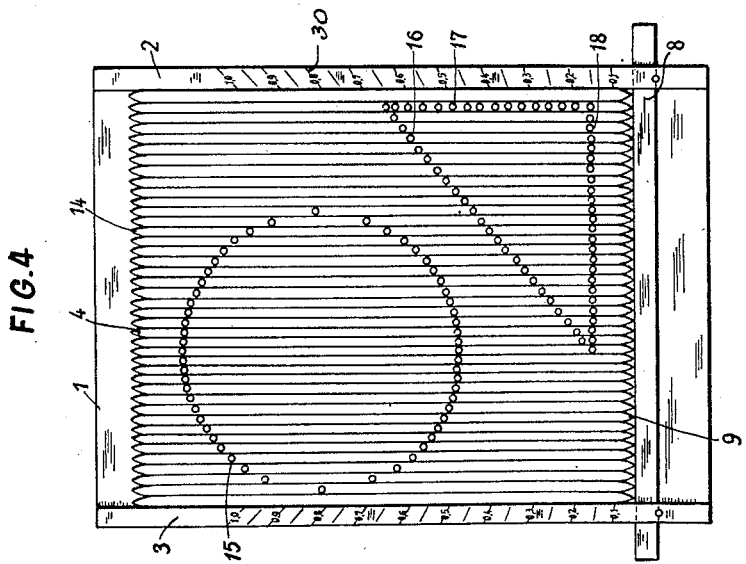
INVENTOR
T. Marzani United States Patent Office 2,821,792
Patented Feb. 4, 1958

2,821,792

APPARATUS FOR GRAPHICALLY REPRESENTING THE SUPERPOSITION OF FUNCTIONS

Theodor Marzani, Villach, Austria, assignor to A. M. Faber-Castell, Stein, near Nurnberg, Germany Application December 7, 1953, Serial No. 396,611

Claims priority, application Germany December 11, 1952

12 Claims. (Cl. 35—34)

The invention relates to an apparatus for graphically representing and understanding mathematically the superimposition of two or more functions. According to the invention, the apparatus consists of a base plate on which can be displaced a relatively large number of rods arranged in juxtaposition with parallel side edges, said rods forming the drawing plane. If the bottom edges of the rods are so aligned by displacement in their longitudinal axis that they reproduce the path of a selected function, a second function recorded beforehand in the drawing plane, for example, in the form of dots, merges into a third function which represents the additive superimposition of the two first functions. The apparatus according to the invention may be used, for example, for representing and understanding mathematically simple and compound functions, more especially complicated or variable oscillation processes, systems of curves, for solving algebraic and transcendental equations, for representing equal-area transformations of the plane and also for drawing sine curves of any desired amplitude.

The invention is more fully explained with reference to the drawing, which represents two constructional examples and in which:

Figure 1 is a plan view of one apparatus constructed according to the invention, Figure 1a is a side view of the device of Figure 1, Figure 2 is a section on the line II—II of Figure 1, Figure 3 shows the apparatus according to Figure 1 in another position, Figure 4 shows another constructional form of the apparatus, and Figure 5 shows the apparatus according to Figure 4 in another position.

In the figures, 1 represents the base plate of the apparatus which is provided at the sides with two side bars 2 and 3. Arranged between the side bars 2 and 3 are a number of rods 4 and 5 which are formed with parallel side edges and which can be displaced in the direction of their longitudinal axes. The rods 4 and 5 represent the drawing plane of the appliance. In order to obtain a better subdivision of the drawing plane, the rods 5 are made a different color from the rods 4. The interposition of the rods 5 between the rods 4 may be brought in relation to the scale of the horizontal axis or abscissae axis. Therefore, as shown in the example which is illustrated, the spacing between the separate rods 5 may be so selected that it corresponds to $\pi/2$.

In order to assure a parallel displacement of the rods, each rod may be individually guided. A particularly simple construction is, however, provided for the apparatus if the rods are all guided between two side bars connected to the base plate. The separate rods are then mutually guided. However, it is also possible for the rods to be guided in groups in order to increase the precision.

In order to facilitate the adjustment of one of the functions at the bottom edge of the rods, a coordinate system provided with a scale may be recorded on the base plate 1. The actual function may, however, be adjusted in a particularly simple and rapid manner if a template 10 is pushed from the bottom end on to the base plate 1 in the direction of the longitudinal axis of the rods 4, 5 as seen in Figure 1. It will be noted that these rods 4, 5 may be unitary or may be made up of two similar rods 4', 4" and 5', 5", as seen in Figures 1a and 2, for the purposes to be later described. The edge 11 of the said template represents the desired function. In order that an error-free adjustment is possible with the actual template independently of the width of the rods, which are preferably adapted to the required scale, the rods are pointed at least at their bottom ends as at 9. However, if templates are also to be introduced from the upper end, the rods are preferably provided with a corresponding pointing also at their upper ends as at 14. Slots 3' are formed at the upper and lower ends of the side bars 2 and 3 (Fig. 1a) to receive the templates. The insertion of the functional templates may, however, also take place from the side, the individual rods having first been pushed upwardly by a straight edge. After insertion of the template is completed, the rods are allowed to slide down by their own weight on to the template edge 11 which represents the function. Each template may also be used as a superposition curve with any desired lateral displacement, referred to as phase displacement. For accurate adjustment of the phase displacement, it is advantageous to use corresponding scales on the templates and on the base plate 1. Such markings are clearly shown in Figures 1 and 3. By continuous regular phase displacement, it is even possible with this apparatus to demonstrate and also to film the superimposition of moving functions, for example, of travelling waves. By the superimposition of phase-displaced sine oscillations of the same wave-length, the sine oscillations of any desired amplitude can be represented and traced or drawn for the prescribed wave-length.

In order to be able to explain the action of the apparatus in a particularly clear manner, one or more mathematical, preferably trigonometrical, functions may be recorded in advance in permanent form on the drawing plane formed by the rods. The recording is expediently effected by a point lying in the path of the function being represented on the center of each rod. If geometrical figures or a circle, a triangle or the like are recorded on the drawing plane, it is possible, as seen in Figures 4 and 5, to demonstrate in a particularly clear and convincing manner the affinity of a circle and ellipses, of displaced triangles, rectangles and other geometrical figures by means of a straight-edge which is inserted at a selected angle to the bottom edge of the base plate. Moreover, it is also possible to prove the similarity of surfaces of the figures associated with one another. In addition, constructions of circles of curvature are capable of being easily proved by the displacement by the straight-edge. For the adjustment of the straight-edge at predetermined angles, scales are preferably arranged on the marginal bars of the apparatus as seen in Figures 4 and 5.

If a treble additive superimposition is to be represented, this may be effected, for example, in such manner that the functional diagram obtained by the superimposition of two functions is retained by recording on transparent paper and from this, after the rods have been brought back to their basic position again in which the ends of the rods form a straight line, is transferred back to the drawing plane of the apparatus. By insertion of a template which represents the third function, the diagram of the superimposition function obtained from the three separate functions is then determined.

In stead of this arrangement, however, for producing a treble superimposition, it is also possible that first a template similar to template 10 which represents one of the functions with negative sign, is inserted into the apparatus and then the second function is recorded on the drawing plane. If the rods 4, 5 are again brought back to their basic position, the function represented on the drawing plan is converted into the superimposition function resulting from the two functions. If thereafter a template also similar to template 10 with the third function is inserted, the superimposition function resulting from all three functions appears on the drawing plane of the apparatus.

A further possibility for representing a plurality of superimpositions is obtained by the arrangement of several layers of rods situated one above the other. This is shown in Figures 1a and 2 where two sets of sliding elements 4', 4" and 5', 5" are shown. The groove 26 for the slide 25 ends at 32 and the line 33 designates the visible part of the line of contact between the two sets of sliding elements. Where a single set of sliding elements are used they may have the same thickness as the combined thickness of the two layers. The rods of these layers are separately or severally displaceable with those rods which are disposed below or above. Templates representing functions may then be successively inserted into each of the separate layers of rods.

In order to facilitate the evaluation of the functions represented on the drawing plane, the invention further provides that a screen plate 23 of transparent material and provided with a coordinate system is associated with the apparatus. In this connection, it is particularly advantageous if the screen plate is guided by means of a guide sytsem 24, 25, 26 connected with the base plate 1 in such manner that it is always displaceable parallel in both coordinate directions. If the screen plate 23 is provided with a logarithmic graduation at least in one coordinate direction, for example, the ordinate direction, it is also possible to read off the function values of product functions.

This structure is shown in Figures 1, 1a and 2 where plate 23 is slidable laterally in frame 24 which, in turn, can be moved up and down by pusher 25 in grooves 26 of side strips 2 or 3. The plate and the upper and lower frame strips may carry a logarithmic scale 27 or 27'. Alongside they also show metric graduations.

In Figures 1 and 3 the base plate 1 or template 10 is also shown as carrying marks 28 or 29 for reading the phase displacements of the curve represented by the template. Figures 4 and 5 show scales 30 applied to the side strips 2 and 3 for adjusting the ruler 8.

The apparatus is more especially suitable as an instructional means and calculating appliance for schools and the like. It may, however, also be used as an adding means for empirical functions or statistical curves. The versatility of the uses of the appliance may be substantially further increased by using variable templates which are adjustable mechanically or are made from plastic material.

Finally, the apparatus is also capable of being constructed as a party game or toy, for example, by the fact that the drawing plane has represented thereon pictures which undergo surprising changes or distortions by inserting suitable templates.

Drawn on the drawing plane is a series of dots 6 which, in the position represented in Figure 1, extend parallel to the abscissae axis. There is also shown another series of dots 7 which, when the rods 4 and 5 are so aligned with the aid of a straightedge 8 that their bottom ends 9 in Figure 1 form a straight line, represents the functional diagram of the equation $y = \sin x$.

If now there is inserted into the apparatus from the bottom end a template 10 of which the upper edge 11, in the example illustrated, is constructed in the form of the functional diagram of the equation $y = 0.5 \sin 2x$, and if the rods 4 and 5 are brought into contact with the template, the line 6 of Figure 1 is changed into the functional diagram 12 of the equation $y = 0.5 \sin 2x$. The row of dots 7, on the contrary, are developed to form the functional diagram 13 of the superimposed function which obeys the equation $y = \sin x + 0.5 \sin 2x$.

In order that an error-free adjustment is possible by means of the template 11, independently of the width of the rods 4 and 5, the rods 4 and 5 are pointed both at their bottom ends 9 and at their upper ends 14. The pointing of the rods 4 and 5 at the upper ends 14 is particularly necessary if templates are also to be inserted into the apparatus from above.

In the constructional example of the invention as represented in Figure 4, the drawing plane has represented thereon a row of dots 15 in the form of a circle and also a row of dots 16, 17, 18 in the form of a triangle.

By displacing the rods 4 with the aid of the straightedge 8 in such manner that the connecting line of the ends 9 of the rods forms an angle with the abscissae axis, as shown in Figure 5, the series of dots 15 changes into an elliptical series of dots 22. The right-angled triangle formed by lines 16, 17, 18 is converted into an obtuse-angled triangle which follows the lines 19, 20, 21. A comparison of the two representations of Figure 4 on the one hand and Figure 5 on the other hand illustrates particularly clearly the similarity of the surfaces of the displaced figures. Instead of the functional diagrams selected in the constructional examples, it is obviously also possible for other, for example, quadratic or cubic parabolas and the like to be recorded and then displaced or brought to the superimposed position. The apparatus according to the invention may be further amplified by the fact that the functions are recorded in logarithmic scale. By superimposition, there is then obtained the logarithmic diagram of the product function.

By applying the screen plate 23 of transparent material it is possible at any time to determine and read off in the drawing plane the abscissae and ordinate values of the individual points of the functional diagrams. The screen plate is constructed as a sliding member with which a displacement and adjustment in any direction is possible. Not only is it possible then to represent displacements and superimpositions diagrammatciall with the apparatus, but higher and transcendental equations can be solved with the aid of the screen plate. The screen plate is provided at least in one direction with a logarithmic graduation and thus can be used for reading off product functions.

I claim:

1. A device for the mechanical production and interpretation of a curve and of the superposition of two or more mathematical functions, comprising a base plate, side bars along each side of said base plate, a plurality of rods in lengthwise displaceable relation between said side bars, the upper sides of said rods constituting a drawing surface on which representation of at least a first function may be depicted, and at least one template for selective use by which a second function can be superimposed on the representation of said first function, means to indicate at least one predetermined position at which to place said template, said template being placed in predetermined position on said base plate abutting one end of said rods whereby the rods, and therefor the representation of said first function on the rods, will be displaced in accordance with said second function represented by said template.

2. A device for mechanical representation or interpretation of a curve of two or more superimposed functions, comprising a base plate, two side bars arranged on opposite sides of said base plate, slots in said side bars, a plurality of rods arranged slidably lengthwise and guided by said bars, the upper sides of said rods constituting a drawing surface on which representation of at least one functional curve may be made and upon which a second functional curve may be superimposed, a template having a profile representing said second functional curve to be pressed against the upper or lower rod ends to effect the superimposition of said second function, the template being guided in said slots of the side bars.

3. Apparatus according to claim 1 wherein the templates are constructed to be adjustable both parallel to and at right angles to the axes of said rods.

4. Apparatus according to claim 1 wherein the base plate, side bars connected therewith, and the templates are provided with indicia for indicating phase displacements of the functions represented by the templates.

5. Apparatus according to claim 1 wherein the rods are pointed on at least one end.

6. Apparatus according to claim 1 wherein mathematical and trigonometrical functions in the form of curves are recorded, by means of dots, on the drawing plane formed by the rods.

7. Apparatus according to claim 6 wherein geometrical figures, for example, a circle, a triangle or the like, are recorded in the form of dots on the drawing plane formed by the rods and the template associated with it is a straight-edge.

8. Apparatus according to claim 7 wherein indicia for selectively adjusting the straightedge are arranged on the side bars.

9. Apparatus according to claim 1 more especially for representing compound superimpositions, characterised by the arrangements of a plurality of layers of rods disposed one above the other, said layers of rods being adapted to be displaced separately or jointly with respect to the rods situated above or below by said template.

10. Apparatus according to claim 1 characterised by a screen plate of transparent material provided with a co-ordinate system overlaying said rods.

11. Apparatus according to claim 10 wherein the screen plate is displaceable parallel to itself in both coordinate directions with the aid of a guide system of indicia connected to the base plate.

12. Apparatus according to claim 10 wherein the screen plate is provided with a logarithmic graduation, at least in one coordinate direction.

References Cited in the file of this patent

UNITED STATES PATENTS

| | | |
|---|---|---|
| 416,593 | Gillis | Dec. 3, 1889 |
| 1,041,145 | Moss | Oct. 15, 1912 |
| 1,268,613 | Radebaugh | June 4, 1918 |
| 1,700,318 | Karsten | Jan. 29, 1929 |
| 1,740,978 | Goldsmith | Dec. 24, 1929 |
| 2,266,457 | Wolff | Dec. 16, 1941 |

FOREIGN PATENTS

| | | |
|---|---|---|
| 52,574 | Switzerland | Aug. 25, 1910 |